United States Patent
Bouvet

(10) Patent No.: US 11,184,758 B2
(45) Date of Patent: Nov. 23, 2021

(54) METHOD AND DEVICE FOR MANAGING USER SERVICE PROFILES

(71) Applicant: ORANGE, Issy-les-Moulineaux (FR)

(72) Inventor: Bertrand Bouvet, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 16/768,442

(22) PCT Filed: Nov. 21, 2018

(86) PCT No.: PCT/FR2018/052944
§ 371 (c)(1),
(2) Date: May 29, 2020

(87) PCT Pub. No.: WO2019/106261
PCT Pub. Date: Jun. 6, 2019

(65) Prior Publication Data
US 2020/0389782 A1    Dec. 10, 2020

(30) Foreign Application Priority Data

Nov. 30, 2017   (FR) ...................................... 1761436

(51) Int. Cl.
*H04W 4/00*        (2018.01)
*H04W 8/12*        (2009.01)
(Continued)

(52) U.S. Cl.
CPC ............... *H04W 8/12* (2013.01); *H04W 8/18* (2013.01); *H04W 48/04* (2013.01)

(58) Field of Classification Search
CPC ......... H04W 8/12; H04W 8/18; H04W 48/04; H04W 8/02
(Continued)

(56) References Cited

U.S. PATENT DOCUMENTS

| 5,915,220 A | * | 6/1999 | Chelliah | ................. H04W 8/18 455/433 |
| 6,353,740 B1 | | 3/2002 | Granberg | |

(Continued)

FOREIGN PATENT DOCUMENTS

| EP | 0983699 A1 | 3/2000 |
| EP | 1730883 A2 | 12/2006 |

(Continued)

OTHER PUBLICATIONS

English translation of the Written Opinion of the International Searching Authority dated Jan. 28, 2019 for corresponding International Application No. PCT/FR2018/052944, filed Nov. 21, 2018.

(Continued)

*Primary Examiner* — Mark G. Pannell
(74) *Attorney, Agent, or Firm* — David D. Brush; Westman, Champlin & Koehler, P.A.

(57) ABSTRACT

A method for managing user service profiles by an entity for managing the profiles of user services in a nominal network, before dispatching to a third-party entity a service profile of a the user. The method includes determining whether the third-party entity is in a visited network different from the nominal network; if so, determining, on the basis of the service profile of the user recorded in the profiles management entity, if the user has at least one mark associated with an IN originating service; if so, checking to determine whether there exists an intelligent network agreement between an operator of the nominal network and an operator of the visited network and if relevant the nature of the agreement; and dispatching, to the third-party entity, a service profile of the user determined as a function of a type of the service and of the result of the checking.

20 Claims, 2 Drawing Sheets

(51) Int. Cl.
*H04W 8/18* (2009.01)
*H04W 48/04* (2009.01)

(58) Field of Classification Search
USPC .......................................................... 455/433
See application file for complete search history.

(56) References Cited

U.S. PATENT DOCUMENTS

| | | | |
|---|---|---|---|
| 7,069,002 B2* | 6/2006 | Boland ................. | H04M 3/537 340/7.22 |
| 2005/0186960 A1* | 8/2005 | Jiang ................. | H04L 29/06027 455/435.1 |
| 2006/0240822 A1 | 10/2006 | Jiang | |
| 2008/0146221 A1* | 6/2008 | Noldus ................... | H04W 8/18 455/433 |
| 2009/0061854 A1* | 3/2009 | Gillot .................... | H04W 24/00 455/432.1 |
| 2009/0061860 A1* | 3/2009 | Jiang ..................... | H04W 24/06 455/433 |
| 2010/0087191 A1* | 4/2010 | Kocsis ................. | H04W 12/06 455/433 |
| 2010/0128685 A1* | 5/2010 | Jiang ....................... | H04W 8/12 370/329 |
| 2010/0144344 A1* | 6/2010 | Jiang ....................... | H04W 4/20 455/433 |
| 2010/0190492 A1* | 7/2010 | Jiang ..................... | H04M 17/00 455/432.1 |
| 2011/0124331 A1* | 5/2011 | Jiang ..................... | H04M 15/90 455/432.1 |
| 2011/0143754 A1* | 6/2011 | Jiang ................. | H04M 15/8038 455/432.1 |
| 2011/0281582 A1* | 11/2011 | Jiang ....................... | H04W 8/12 455/433 |
| 2013/0065582 A1* | 3/2013 | Jiang ....................... | H04W 4/14 455/432.1 |
| 2013/0095828 A1 | 4/2013 | Hursey et al. | |
| 2016/0337845 A1* | 11/2016 | Noldus ................... | H04W 8/26 |
| 2017/0347258 A1* | 11/2017 | Carbone ................. | H04W 4/24 |
| 2018/0115549 A1* | 4/2018 | Chen ................... | H04L 63/0892 |

FOREIGN PATENT DOCUMENTS

| | | |
|---|---|---|
| WO | 9853626 A1 | 11/1998 |
| WO | 2005081962 A2 | 9/2005 |
| WO | 2005081962 A3 | 9/2005 |
| WO | 2016180865 A1 | 11/2016 |
| WO | 2017098324 A1 | 6/2017 |

OTHER PUBLICATIONS

International Search Report dated Jan. 9, 2019 for corresponding International Application No. PCT/FR2018/052944, filed Nov. 21, 2018.
Written Opinion of the International Searching Authority Report dated Jan. 9, 2019 for corresponding International Application No. PCT/FR2018/052944, filed Nov. 21, 2018.
"3rd Generation Partnership Project; Technical Specification Group Services and System Aspects; Customised Applications for Mobile network Enhanced Logic (CAMEL); Service Description; Stage 1 (Release 12)", 3GPP Standard; 22078-C00, 3rd Generation Partnership Project (3GPP)?, Mobile Competence Centre; 650, Route Des Lucioles F-06921 Sophia-Antipolis Cedex; France, Oct. 2, 2014 (Oct. 3, 2014), XP050916336.
French Search Report dated Jun. 4, 2018 for corresponding French Application No. 1761436, filed Nov. 30, 2017.

* cited by examiner

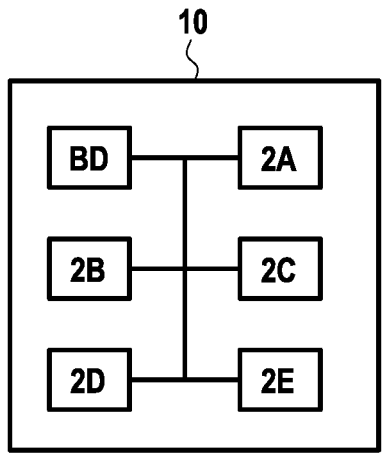
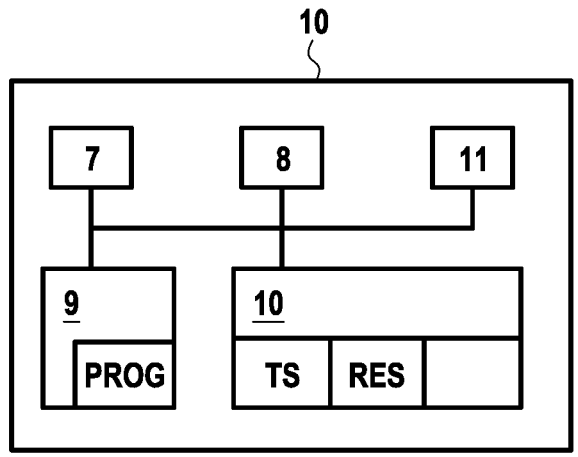
FIG.1
FIG.2
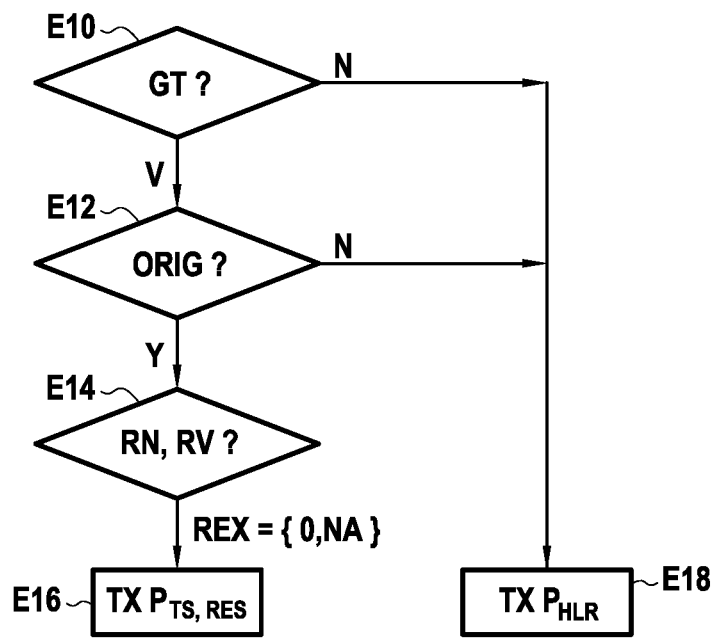
FIG.3

METHOD AND DEVICE FOR MANAGING USER SERVICE PROFILES

CROSS-REFERENCE TO RELATED APPLICATIONS

This Application is a Section 371 National Stage Application of International Application No. PCT/FR2018/052944, filed Nov. 21, 2018, which is incorporated by reference in its entirety and published as WO 2019/106261 A1 on Jun. 6, 2019, not in English.

BACKGROUND OF THE INVENTION

The invention lies in the context of telecommunication networks and more specifically in the context of providing Intelligent Network (IN) services to users while roaming.

It is reminded that IN services, or else IN services, are customized services of an operator that apply to calls whose signaling is standardized.

These IN network services are generally distinguished from MMTel (Multimedia Telephony) services, a standardized 3GPP solution for providing voice, video and other telephony services on 2G/3G/4G/5G cellular networks.

To date, the conditions under which the operator of a nominal network allows its roaming customers in a visited network to benefit from the IN services from which it naturally benefits in its nominal network depend on a possible agreement between the operator of the nominal network and the operator of the visited network.

When such an agreement has not been established, a user roaming in a visited network wishing to benefit from an IN service in this network can, for example, use the mechanisms of USSD (Unstructured Supplementary Service Data) codes (character strings which begin with * or #, include digital service codes and end with #).

This USSD code mechanism allows particularly a user roaming in pre-paid mode to generate an outgoing call from the visited network, even in the absence of a CAMEL (Customized Application for Mobile network Enhanced Logic) IN agreement between the operator of the nominal network and the operator of the visited network. For example, a user in pre-paid mode and while roaming abroad can dial the service code USSD *1234#33296073859# to be connected by telephone to the No 33296073859 in France. Thus, if the balance of the user's pre-paid account is positive, the nominal network itself generates a telephone call to this user while roaming abroad and then, once this first call is established, the nominal network initiates a call supervised by the pre-paid IN service to the dialed number 33296073859 then "connect" these 2 calls.

This solution is not satisfactory because it requires the user to know the USSD code corresponding to the outgoing call service from a visited network without an IN agreement. On the other hand, according to the terminal manufacturers, the content of the terminal call log may be incorrect since this call can be added to the incoming call log while it is an outgoing call.

The invention relates to a solution allowing an operator to provide some IN services to its users while roaming without prior agreement of the intelligent network with the operator of the visited network and which does not have the disadvantages of the above-mentioned solution.

OBJECT AND SUMMARY OF THE INVENTION

Thus, and according to a first aspect, the invention relates to a method for managing user service profiles implemented by a user service profile management entity in a nominal network.

This method is implemented by the user service profile management entity before sending the user service profile to a third party entity. It includes:
- a step of determining whether the third party entity is in the nominal network or in a visited network;
- if the third party entity is in a visited network, a step of determining, on the basis of the user service profile recorded in the profile management entity, whether the user has at least one mark associated with an IN Originating service;
- if the user has at least one mark associated with an IN Originating service, a control step to determine whether there is an intelligent network agreement between an operator of the nominal network and an operator of the visited network and if this agreement exists, the nature of this agreement;
- a step of sending, to the third party entity, a user service profile determined according to a type of this IN Originating service and the result of this control step.

It is recalled that an IN Originating service ("calling service of an IN") designates in particular the interception of all or part of the signaling messages of a session transmitted by a terminal by the switch of the nominal network or of the visited network having taken charge of the terminal during its network connection procedure in order to partially or globally transmit it after protocol adaptation to an IN service processing entity located in the user nominal network and which is responsible for applying specific service logic before giving control back to the switch on this session.

It is recalled that an IN service mark defines all the parameters for triggering this IR, including (i) the address of the gsm-SCF (Global System Mobile—Service Control Function) platform for processing the service logic and (ii) the service key identifying the service logic that must be invoked in this platform and (iii) TDP (Trigger Detection Point) list identifying the detection point of the BCSM (Basic Call State Machine) call processor on which the IN service must be triggered and (iiii) the Default Call Handling which indicates whether the call should be continued or released in the event of an error during a dialogue between gsm-SSF and gsm-SCF.

Correlatively, the invention relates to an entity for managing user service profiles in a nominal network. This entity includes:
- a unit for determining whether a third party entity to which it intends to send a user profile, is in a visited network;
- a unit for determining, if the third party entity is in a visited network, and on the basis of the user service profile recorded in a database managed by the service profile management entity, whether this user has at least one mark associated with an IN Originating service;
- a control unit configured to determine whether there is an intelligent network agreement between a nominal network operator and a visited network operator and, where appropriate, the nature of this agreement;
- a unit for sending, to the third party entity, a user service profile determined according to a type of the IN Originating service and the result of the aforementioned determination carried out by the control unit.

The invention can in particular be implemented by an entity of the HLR (Home Location Register), HSS (Home Subscriber Server) or SDM (Service Data Management) type.

Within the meaning of the invention, the third party entity may in particular be constituted by a switch VMSC (Visited Mobile Switch Center), a server TAS (Telephony Application Server) or a platform SCP (Service Control Platform) or a USSD Gateway platform.

Thus, and generally, the invention allows the user service profile management entity according to the invention, that is to say for example an HLR, HSS or SDM entity to generate a profile dynamically, depending in particular on whether the third party entity to which this profile is to be sent is located in the nominal network or in a visited network. Consequently, two entities which successively request the profile of the same user from the service profile management entity according to the invention can be issued with different profiles.

Indeed, in one embodiment of the invention, the method is implemented when the user service profile management entity according to the invention receives a request from the third party entity to download a user service profile.

Alternatively, or in addition, the method can be implemented when the user profile management entity according to the invention detects a change in the user service profile recorded in its database.

In a particular embodiment of the invention, the step of determining whether the third party entity is in a visited network is carried out based on an international routing address of the third party entity.

This international routing address can for example in particular consist of a global network address known to the person skilled in the art of networks under the term "Global Title". This international address can in particular be:
- a number conforming to the E164 standard used as part of the protocol MAP (Mobile Application Protocol) for example for the exchanges between the VMSC or TAS or SCP or USSD Gateway server and the HLR or SDM; or
- an address domain name/IP address used as part of the DIAMETER protocol, for example for exchanges between the TAS and the HSS or SDM.

In accordance with the invention, when the user has at least one IN Originating service mark, and when the third party entity is located in a visited network, the user service profile sent to the third party entity is determined depending on the existence and nature of an agreement between the operator of the nominal network and the agreement of the visited network. This IN agreement can in particular be a CAMEL type agreement.

The invention can be used by the operator of a nominal network, to provide a user connected to a visited network who does not benefit from an agreement with this nominal network, with a service equivalent to the service provided to this user on the nominal network.

For example, the invention can be used by the operator of a nominal network to allow users to initiate a VoWIFI (Voice over the WI-FI™ wireless networking protocol) call when these users are connected to a visited network by cellular network, even if these users benefit from a pre-paid type subscription, even if there is no agreement to that end between the operator of the nominal network and the operator of the visited network.

In a particular embodiment, the different steps of the method for managing user profiles according to the invention are determined by instructions from computer programs.

Consequently, the invention also relates to a computer program, on an information medium, this program including instructions adapted to the implementation of the steps of a method for managing user profiles according to the invention.

This program can use any programming language, and be in the form of source code, object code, or intermediate code between source code and object code, such as in a partially compiled form, or in any other desirable form.

The invention also relates to an information medium readable by a computer, and including instructions of a computer program as mentioned above.

The information medium can be any entity or device capable of storing the program. For example, the support may include a storage means, such as a ROM, for example a CD ROM or a microelectronic circuit ROM, or also a magnetic recording means, for example a hard disk.

On the other hand, the information medium can be a transmissible medium such as an electrical or optical signal, which can be routed via an electrical or optical cable, by radio or by other means. The program according to the invention can in particular be downloaded from an Internet type network.

Alternatively, the information medium can be an integrated circuit in which the program is incorporated, the circuit being adapted to execute or to be used in the execution of the method in question.

BRIEF DESCRIPTION OF THE DRAWINGS

Other features and advantages of the present invention will emerge from the description given below, with reference to the appended drawings which illustrate an exemplary embodiment thereof devoid of any limiting character. In the figures:

FIG. 1 schematically shows a user service profile management entity in accordance with a particular embodiment of the invention;

FIG. 2 illustrates the hardware architecture of a user service profile management entity in accordance with a particular embodiment of the invention;

FIG. 3 shows in the form of a flowchart, the main steps of a method for managing user profiles in accordance with a particular embodiment of the invention.

DETAILED DESCRIPTION OF AN EMBODIMENT OF THE INVENTION

Figure 4:
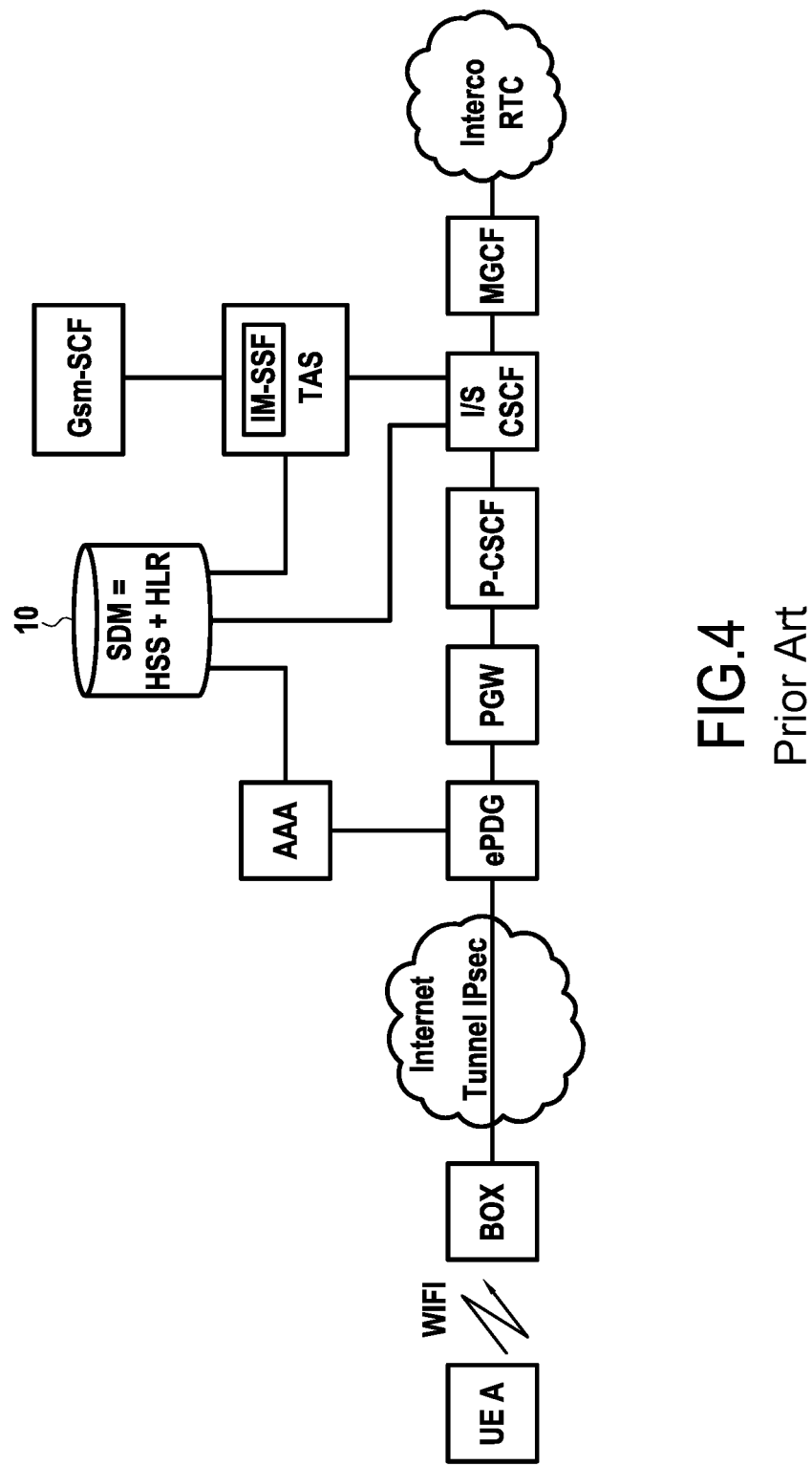
FIG. 4 schematically illustrates the processing of a VoWiFi call in accordance with the state of the art.

FIG. 1 represents an entity 10 for managing user service profiles. This entity 10 can for example be constituted by an HLR, an HSS or an SDM. In a known manner, this entity includes a database BD in which the $P_{HLR}$ profiles of user services are recorded.

In the first embodiment described here, the entity 10 for managing user profiles has the architecture of a computer, as illustrated in FIG. 2. It comprises in particular a processor 7, a random access memory 8, a read only memory 9, a non-volatile flash memory 15 as well as communication means 11. Such means are known per se and are not described in more detail here.

The read-only memory 9 of the device of the entity 10 for managing user profiles constitutes a recording medium in accordance with the invention, readable by the processor 7 and on which is recorded here a computer program PROG in accordance with the invention.

The computer program PROG defines functional and software modules here, configured to implement the steps of a method for managing user service profiles. These functional modules are based on and/or control the hardware elements 7-11 of the entity 10 mentioned above. They comprise in particular here, as illustrated in FIG. 1:

- a unit 2A for determining whether a third party entity to which it intends to send a profile of a said user is located in a visited network or in the nominal network, for example based on an international routing address of said third party entity.
- a unit 2B for determining whether a user has at least one mark associated with an IN Originating service, on the basis of the user service profile recorded in the database BD;
- a control unit 2C configured to determine whether there is an intelligent network agreement between an operator of said nominal network and an operator of said visited network and, where appropriate, the nature of said agreement, for example a CAMEL agreement;
- a sending unit 2D configured to send to a third party entity a user service profile determined according to a type of the Originating service and the result of the determination made by the control unit 2C; and
- a unit 2E configured to detect a change in the user service profile recorded in said database thereof.

The communication means 11 are in particular configured to receive a request from the third party entity to download a user service profile.

With reference to FIG. 3, the main steps of a method for managing user service profiles in a particular embodiment of the invention will now be described.

In the exemplary embodiment described here, this method is implemented by a user service profile management entity HLR in a nominal network, of the type of entity 10 previously described, when the latter intends to send a user service profile to a third party entity AND, either upon request of the third party entity AND, or spontaneously, that is to say in "PUSH" mode when the entity HLR has detected a change in the service profile $P_{HLR}$ of this user recorded in the database BD.

This method includes a step E10 during which the HLR 10 determines whether the third party entity ET is in the nominal network RN or in a visited network RV. In the embodiment described here, this determination step E10 is carried out by analyzing the international routing address of the third party entity. In the embodiment described here, this address is of the Global Title type. This analysis can in particular be carried out by comparing a prefix of the address E164 with a table including prefixes in relation with network locations.

If it is determined in step E10 that the third party entity ET is in a visited network RV (result of the test E10="V"), step E10 is followed by a step E12 during which the entity HLR determines, on the basis of the user service profile $P_{HLR}$ recorded in its database BD, whether this user has at least one mark associated with an IN Originating service. If such a mark exists, the type of this service is called TS. This type is stored in a memory register 15.

If it is determined in step E12 that the user has at least one IN Originating service mark, step E12 is followed by a control step E14 during which the entity HLR determines whether there is an intelligent network agreement between an operator of the nominal network RN and an operator of the visited network RV, and where appropriate the nature of this agreement.

In the embodiment described here, the result of the control step E14 is stored in a variable RES of the memory 15, whose value is 0 if there is no agreement between the operator of the nominal network RN and the operator of the visited network RV or a non-zero value NA representative of the nature of this agreement if this agreement exists.

During a step E16, the entity HLR sends, to the third party entity, a service profile PTS, RES of the user determined dynamically according to the type TS of the IN Originating service and the result RES of the control step E14.

In the embodiment described here, if it is determined in step E10 that the third party entity is in the nominal network (result of the test E10="N") or if it is determined in step E12 that the user does not have an IN Originating service mark, the entity HLR sends the profile $P_{HLR}$ to the third party entity TE during a step E18.

EXAMPLE OF PROBLEM SOLVED BY THE INVENTION

We will now describe how the invention can be used by the operator of a nominal network to allow users to initiate a VoWIFI (Voice over WI-FI™) call when they are connected to a visited network by cellular network, even if these users benefit from a pre-paid subscription, as soon as there is an agreement to that end between the operator of the nominal network and the operator of the visited network.

It is recalled that the pre-paid mode systematically requires the use of the CAMEL IN service.

Consequently, when a user benefits from a pre-paid subscription, his user service profile $P_{HLR}$, as recorded in the database managed by the entity HLR of the nominal network includes, in addition to conventional telephone service marks, trigger marks for Originating O-CSI (Originating Camel Subscription Information) services and optionally trigger marks for Terminating T-CSI (Terminating Camel Subscription Information) services of an intelligent network.

When such a user finds himself under 2G/3G/4G cellular coverage of a visited network, the switch VMSC of this visited network (Visited Mobile Switch Center), after connecting the terminal to the network, requests the download of the service profile of the customer by interrogating the entity HLR of the nominal network.

Upon receipt of this request, the entity HLR of the nominal network verifies whether there is a roaming agreement with CAMEL IN service support with the operator of the visited network based on the identifiers MNC (Mobile Network Code) and MCC (Mobile Country Code) and/or GT address transmitted in the MAP (Mobile Application Part protocol) used between the VMSC and the HLR.

If there is no smart network agreement between the operator of the nominal network and the visited network operator, then:

- the entity HLR of the nominal network activates the MMTel Outgoing Call Barring service before returning the customer's service profile to the VMSC so as to prohibit any outgoing call; and
- the entity HLR of the nominal network does not send the Originating O-CSI service trigger marks to the switch VMSC of the visited network. The service profile returned by the HLR to the V-MSC explicitly indicates to the VMSC that this customer is not allowed to make outgoing calls and that the VMSC must block/prohibit any attempt to make an outgoing call by the caller.

Under these conditions, if the user tries to make an outgoing call via the 2G/3G/4G cellular network, the switch VMSC broadcasts a voice message informing the user of the impossibility of making outgoing calls and can offer him to use a USSD code to make outgoing calls.

It is now assumed that the user, while remaining connected to the 2G/3G/4G cellular network of the visited network, decides to make a VoWiFi call.

In a known manner and as shown in FIG. 4, the terminal UE A connects through any WI-FI™ access point AP to an ePDG (enhanced Packet Data Gateway) entity, entry point of the nominal network, via an IPsec channel established between the terminal UE and this ePDG entity.

This ePDG entity is connected to an AAA (Authentication, Authorization, Accounting) server, which is in turn connected to the HLR/HSS entity 10 for managing user service profiles in the nominal network and in the core of the network IMS via a PGW equipment.

After verification of the credentials related in particular to the authentication and encryption by the AAA server and by the HLR/HSS server, the terminal UE A sends a SIP REGISTER message which arrives at the S-CSCF in the core of the IMS nominal network and goes up via the Third Party Registration procedure to a Server TAS (Telephony Application Server).

The Server TAS downloads the customer's service profile from the HLR/HSS 10.

Without the implementation of the invention, this profile is identical to that previously downloaded into the visited network by the switch VMSC of the 2G/3G/4G cellular network to which the terminal is connected.

As established above, due to the absence of an intelligent network agreement between the operator of the nominal network and the operator of the visited network, the Outgoing Call Barring field is positioned in the user service profile so as to prevent the user from making outgoing calls in a standard way from the visited network.

This also has the effect of activating the Outgoing Call Barring service in the Server TAS in the same way. Therefore, the outgoing calls are also prohibited for this user, even in VoWiFi. Concretely, when the user's terminal sends a SIP INVITE message to generate an outgoing call, the Server TAS refuses to make the call and replies, for example, to this SIP INVITE message with a 403 Forbidden message.

Note that if the user had configured his terminal in a mode called "airplane" mode (2G, 3G, 4G cellular modes deactivated, WI-FI™ mode activated), the VoWiFi call could have been made; indeed, if the terminal is not connected to the visited network by cellular network, the Outgoing Call Barring service is deactivated in the user's service profile managed by the HLR/HSS entity of the nominal network.

The method and the HLR/HSS entity 10 according to the invention allow in particular to solve this problem. Indeed, when the Server TAS requests the download of the user service profile, the HLR/HSS entity detects, in step E10 that this request comes from a third party entity of the nominal network and authorizes the outgoing calls by sending to the Server TAS a profile in which the MMtel Outgoing Call Barring service is deactivated, even if the terminal is connected on a 2G/3G/4G cellular network in the visited network.

ANOTHER EXAMPLE OF IMPLEMENTATION OF THE INVENTION

The invention can also be used for example for the implementation of the IN Originating service "Wrong Number Correction".

It is recalled that this service, activated only when the user is located in a visited network, consists in supplementing or adapting the called number if the user dials a number that cannot be interpreted by the visited network, typically when the user applies out of habit the same numbering rules that he currently uses in his nominal country.

If there is a roaming agreement with the network operator visited with IN service support, the IN Originating service Wrong Number Correction allows for example in the case of a call to France from a visited country automatically replacing the number dialed by the user 0ZABPQMCDU with 0033ZABPQMCDU or +33ZABPQMCDU.

In the current state of the art, if there is no IN Originating service agreement with the operator of the visited network, the customer, under 2G/3G/4G cellular coverage, cannot benefit of this service.

On the other hand, when the user initiates a VoWiFi call from anywhere in the world, the terminal is located as if it were in the nominal network, since the ePDG entity and the IMS core entity with the TAS are always in the nominal network. Therefore, it is not useful to trigger this IN Originating service.

The invention can therefore be used to avoid triggering the IN Originating service Wrong Number Correction when the HLR/HSS entity receives a profile download request from a nominal network entity, in this case from a server TAS.

The invention claimed is:

1. A method for managing user service profiles implemented by a profile management entity for managing user service profiles in a nominal network, said method being implemented when a terminal, connected to a visited network by a cellular network, initiates a Voice Over WiFi (VoWifi) call via the nominal network thereof, said method including:
   generating a second user service profile associated with the terminal for an entity of the nominal network thereof;
   sending, to the entity of the nominal network, the generated second user service profile;
   said second user service profile generated for the nominal network entity being able to be distinct from a first user service profile previously generated and sent to an entity of the visited network to which the terminal is connected by the cellular network, wherein the second user service profile is determined depending on existence or not of an intelligent network roaming agreement between said visited network and said nominal network.

2. The method according to claim 1, further comprising:
   the profile management entity receiving a request from said nominal network entity to download the second user service profile when the terminal initiates the VoWiFi call; and
   the profile management entity implementing the generating and the sending upon receipt of the request.

3. The method according to claim 1, wherein:
   the second user service profile is recorded in the profile management entity, and
   the profile management entity implements the generating and sending upon detection of a change in said second user service profile recorded in the profile management entity.

4. The method according to claim 1, wherein the roaming agreement comprises the support or not of a CAMEL intelligent network service, Customized Application for Mobile network Enhanced Logic.

5. The method according to claim 1 wherein an intelligent network agreement between said visited network and said nominal network is nonexistent, and said second user service profile generated for said nominal network entity is distinct from the first user service profile previously generated for said entity of the visited network.

6. The method according to claim 5, wherein the second user service profile generated for the nominal network entity authorizes outgoing calls and the first user service profile generated for the visited network entity prohibits said outgoing calls.

7. The method according to claim 1, comprising detecting a change in said second user service profile recorded in a database of the profile management entity.

8. A management entity for managing user service profiles in a nominal network, wherein the management entity includes:
   a processor; and
   a non-transitory computer-readable medium comprising instructions stored thereon which when executed by the processor configure the management entity to:
   receive a request from a nominal network entity to download a second service profile associated with a terminal, said terminal being connected to a visited network by a cellular network, and having initiated a Voice Over WiFi (VoWifi) call via said nominal network;
   generate the second user service profile for said nominal network entity; and
   send, to said nominal network entity, the generated second user service profile;
   said second user service profile generated for the nominal network entity being able to be distinct from a first user service profile previously generated and sent by said management entity to an entity of the visited network, wherein the second user service profile is determined depending on existence or not of an intelligent network roaming agreement between said visited network and said nominal network.

9. The management entity according to claim 8, wherein the instructions further configure the management entity to detect a change in said second user service profile recorded in a database of the management entity.

10. The management entity according to claim 8, wherein the instructions further configure the profile management entity to receive a request from said nominal network entity to download the second user service profile when the terminal initiates the VoWiFi call, and to generate and send the second user service profile upon receipt of the request.

11. The management entity according to claim 8, wherein:
   the second user service profile is recorded in the profile management entity, and
   wherein the instructions further configure the profile management entity to generate and send the second user service profile upon detection of a change in said second user service profile recorded in the profile management entity.

12. The management entity according to claim 8, wherein the roaming agreement comprises the support or not of a CAMEL intelligent network service, Customized Application for Mobile network Enhanced Logic.

13. The management entity according to claim 8, wherein an intelligent network agreement between said visited network and said nominal network is nonexistent, and said second user service profile generated for said nominal network entity is distinct from the first user service profile previously generated for said entity of the visited network.

14. The management entity according to claim 13, wherein the second user service profile generated for the nominal network entity authorizes outgoing calls and the first user service profile generated for the visited network entity prohibits said outgoing calls.

15. A non-transitory computer-readable recording medium on which a computer program is recorded comprising instructions for execution of a method for managing user service profiles implemented by a management entity for managing user service profiles in a nominal network, when the instructions are executed by the management entity, said instructions configuring the management entity to implement the method when a terminal, connected to a visited network by a cellular network, initiates a Voice Over WiFi (VoWifi) call via the nominal network thereof, said method including:
   generating a second user service profile for an entity of the nominal network thereof;
   sending, to the entity of the nominal network, the second user service profile;
   said second user service profile generated for the nominal network entity being able to be distinct from a first user service profile previously generated and sent to an entity of the visited network to which the terminal is connected by the cellular network, wherein the second user service profile is determined depending on existence or not of an intelligent network roaming agreement between said visited network and said nominal network.

16. The non-transitory computer-readable recording medium according to claim 15, the method further comprising:
   the profile management entity receiving a request from said nominal network entity to download the second user service profile when the terminal initiates the VoWiFi call; and
   the profile management entity implementing the generating and the sending upon receipt of the request.

17. The non-transitory computer-readable recording medium according to claim 15, wherein:
   the second user service profile is recorded in the profile management entity, and
   the profile management entity implements the generating and sending upon detection of a change in said second user service profile recorded in the profile management entity.

18. The non-transitory computer-readable recording medium according to claim 15, wherein the roaming agreement comprises the support or not of a CAMEL intelligent network service, Customized Application for Mobile network Enhanced Logic.

19. The non-transitory computer-readable recording medium according to claim 15, wherein an intelligent network agreement between said visited network and said nominal network is nonexistent, and said second user service profile generated for said nominal network entity is distinct from the first user service profile previously generated for said entity of the visited network.

20. The non-transitory computer-readable recording medium according to claim 19, wherein the second user service profile generated for the nominal network entity authorizes outgoing calls and the first user service profile generated for the visited network entity prohibits said outgoing calls.

* * * * *